(12) United States Patent
Wilson et al.

(10) Patent No.: US 7,647,460 B1
(45) Date of Patent: Jan. 12, 2010

(54) METHOD AND APPARATUS FOR IMPLEMENTING A REMOTE MIRRORING DATA FACILITY WITHOUT EMPLOYING A DEDICATED LEASED LINE TO FORM THE LINK BETWEEN TWO REMOTELY DISPOSED STORAGE DEVICES

(75) Inventors: Robert Wilson, Hopkinton, MA (US); Dennis P. J. Ting, Groton, MA (US); Mehamood Hosein, Stoughton, MA (US)

(73) Assignee: EMC Corporation, Hopkinton, MA (US)

( * ) Notice: Subject to any disclaimer, the term of this patent is extended or adjusted under 35 U.S.C. 154(b) by 1644 days.

(21) Appl. No.: 08/935,844

(22) Filed: Sep. 23, 1997

(51) Int. Cl.
*G06F 12/00* (2006.01)

(52) U.S. Cl. ..................................... 711/162

(58) Field of Classification Search ................. 711/162, 711/161, 112, 113, 114; 364/187; 714/1–4, 714/6, 7, 13, 11, 12; 709/203, 208, 217, 709/218, 219
See application file for complete search history.

(56) References Cited

U.S. PATENT DOCUMENTS

| | | | | |
|---|---|---|---|---|
| 5,212,784 A | * | 5/1993 | Sparks | .................... 395/575 |
| 5,513,314 A | * | 4/1996 | Kandasamy et al. | ... 395/182.04 |
| 5,537,533 A | * | 7/1996 | Staheli et al. | .......... 395/182.03 |
| 5,544,347 A | | 8/1996 | Yanai et al. | |
| 5,764,903 A | * | 6/1998 | Yu | .................... 395/200.38 |
| 5,777,874 A | * | 7/1998 | Flood et al. | .................. 364/187 |
| 5,799,141 A | * | 8/1998 | Galipeau et al. | ....... 395/182.11 |
| 5,835,953 A | * | 11/1998 | Ohran | .................... 711/162 |
| 5,933,653 A | * | 8/1999 | Ofek | .................... 395/826 |
| 5,935,207 A | * | 8/1999 | Logue et al. | ................ 709/219 |
| 5,951,644 A | * | 9/1999 | Creemer | .................... 709/229 |
| 5,960,216 A | * | 9/1999 | Vishlitzky | .................... 395/894 |
| 5,991,813 A | * | 11/1999 | Zarrow | .................... 709/236 |
| 6,003,030 A | * | 12/1999 | Kenner et al. | ................. 707/10 |

OTHER PUBLICATIONS

Black Uyless, Computer Networks Protocols, Standards and Interfaces, Second Edition, pp. 159-161, Dec. 1993.*

* cited by examiner

*Primary Examiner*—Christian P Chace
(74) *Attorney, Agent, or Firm*—Muirhead and Saturnelli, LLC

(57) ABSTRACT

A method and apparatus for implementing a remote mirroring data facility for a computer system comprising a central processing unit (CPU); a first storage system that is coupled to the CPU so that the CPU can store information in the first storage system; a second storage system coupled to the CPU via a communication link; and a mirroring controller to mirror at least some of the information stored in the first storage system in the second storage system by transferring the at least some of the information over the communication link. The communication link can be implemented via a network cloud, which may be the Internet or an intranet. Multiple pipes can be used to pass data through the network cloud in parallel. Alternatively, the communication link can be implemented using wireless technology.

51 Claims, 5 Drawing Sheets

| Application Layer (e.g., RDF Protocol) ~30 | Presentation Layer ~31 | Session Layer ~32 | Transport Layer (e.g., UDP, TCP) ~33 | Network Layer (e.g., IP) ~34 | Data Link Layer (e.g., Ethernet, T3, ATM) ~35 | Physical Layer ~36 |
|---|---|---|---|---|---|---|

Fig. 3

METHOD AND APPARATUS FOR IMPLEMENTING A REMOTE MIRRORING DATA FACILITY WITHOUT EMPLOYING A DEDICATED LEASED LINE TO FORM THE LINK BETWEEN TWO REMOTELY DISPOSED STORAGE DEVICES

FIELD OF THE INVENTION

The present invention is directed to a method and apparatus for implementing an interface between a source storage device and a remotely disposed target mirroring storage device.

BACKGROUND OF THE INVENTION

An illustrative configuration of a remote mirroring data facility is shown in FIG. 1. In the system shown in FIG. 1, a host CPU 1 is coupled to a source storage device 3 through a source storage controller 5. The storage device 3 may be a large disc drive providing main storage for the host CPU 1, or it may be a plurality of smaller disc drives arranged to perform the same function. An example of such a storage device is the SYMMETRIX line of disc arrays, available from EMC Corporation, Hopkinton, Mass.

The data stored in storage device 3 may be crucial to the operation of host CPU 1. Therefore, a contingency solution is desirable in the event that a problem is experienced with the storage device 3, to ensure that the stored data is not lost and to minimize the risk of CPU 1 being down due to problems with the storage device. Potential problems with the storage device 3 can include hardware and software errors that may make stored data unrecoverable, as well as catastrophic events, such as an earthquake or other natural disaster that could result in the destruction of the storage device.

One solution for protecting the data stored in storage device 3 is to mirror the data in another storage device. FIG. 1 illustrates such a system, wherein the source storage controller 5 is coupled to a target storage controller 7 and an associated target storage device 9. As data is written to the source storage device 3, it can also be written and mirrored to the target storage device 9. If the storage device 3 is destroyed or experiences an error that renders stored data unrecoverable, the data can be retrieved from the mirroring storage device 9. As shown in FIG. 1, the target storage controller 7 and target storage device 9 can also serve as the main storage system for another host CPU 11. Alternatively, the target storage system can be dedicated solely to mirroring the data stored in the source storage system, without being coupled to another CPU.

The level of protection provided by the system shown in FIG. 1 is enhanced when the mirroring target storage system (controller 7 and storage device 9) is disposed at a location remote from the source storage system (controller 5 and storage device 3), so that if a catastrophe occurs that destroys the source system, the likelihood of the mirroring storage system also being destroyed is greatly decreased. Thus, it is advantageous to implement a link 13 between the source and target storage controllers 5 and 7 that enables the target storage system to be disposed a relatively long distance away from the source storage system.

Communication between the host CPU 1 and the source storage controller 5 is typically performed using one of a number of standard protocols, including SCSI, BUS and TAG (B&T), or more typically ESCON. ESCON is a standard computer system interface and protocol developed by International Business Machines (IBM). ESCON defines the interface and protocol for communicating over a link 15 between the host CPU 1 and the source storage controller, and is described in detail, for example, in "ENTERPRISE SYSTEMS ARCHITECTURE/390—ESCON I/O INTERFACE", 3rd Edition (1992) published by IBM. Because ESCON is used as the protocol to establish the interface between the host CPU 1 and the source storage controller 5, it has also conventionally been used to implement the link 13 between the source and target storage controllers 5 and 7 in a remote mirroring data facility such as the one shown in FIG. 1. Thus, link 13 has conventionally been implemented using a dedicated ESCON link that allows the target storage controller 7 to be disposed at a location somewhat remote from the source storage controller 5. However, these dedicated links have conventionally been limited to relatively short distances. For example, IBM states that its dedicated ESCON links are limited to approximately 60 km. Although this number may be conservative, it is believed that conventional dedicated ESCON links are limited to distances of approximately 80 km, even when appropriate repeaters are used along the line.

The use of a dedicated ESCON line to implement the link 13 between the source and target storage controllers 5 and 7 in a remote mirroring data facility is disadvantageous for two reasons. First, the above-described limit on the maximum supported distance may be insufficient for some applications. Second, it is often costly to implement these dedicated links because they are not part of a public communications network, and may not be capable of implementation over pre-existing communication lines.

To address the foregoing limitations on the use of a dedicated ESCON link to implement a remote mirroring data facility, the assignee of the present application has developed a technique for implementing a remote mirroring data facility using a link 13 implemented through pre-existing public communication channels, as disclosed in the following two U.S. patent applications, each of which is incorporated herein by reference: Ser. No. 08/601,733, entitled METHOD AND APPARATUS FOR INTERFACING TWO REMOTELY DISPOSED DEVICES COUPLED VIA A TRANSMISSION MEDIUM, filed Feb. 15, 1996; and Ser. No. 08/947,926, entitled METHOD AND APPARATUS FOR INTERFACING TWO REMOTELY DISPOSED DEVICES COUPLED VIA A TRANSMISSION MEDIUM, filed Aug. 25, 1997 (collectively assignee's co-pending applications).

The co-pending applications are directed to the implementation of the link 13 between the source and target storage controllers of a remote mirroring data facility via a data communication line operable in a public communications network. The specific embodiments discussed include data communication lines of the type leased by telephone service companies, such as data communication lines from the family of T-carriers available in North America (e.g., T1, T3 and T5) and the family of CEPT communication links available in Europe (e.g., CEPT-1 and CEPT-3). Leased lines such as a T-3 line are a service provided by telephone service companies in which a subscriber pays a flat fee to lease exclusive use of a data communication link between two locations. These leased lines employ existing telephone lines, satellite links, etc., to provide high speed data transmission within a public communications network between the two points requested by the subscriber. By implementing the link 13 in a remote mirroring data facility through a public communications network, the expense and time that would be incurred in implementing a conventional dedicated ESCON link between the source and target storage controllers 5 and 7 is avoided. Furthermore, the limitation on the distance over which dedicated ESCON links can extend is overcome, enabling the link 13 to be extended for significantly greater distances, thereby providing increased flexibility in implementing a user's desired configuration and providing enhanced protection in the event of a natural disaster or other catastrophe.

In the assignee's co-pending applications, a number of different protocols are specified for communicating between the source and target storage controllers 5 and 7 through the public communications network to achieve performance improvements as compared with the ESCON protocol. The use of a leased line and any one of these protocols achieves a high performance remote mirroring data facility. However, some user applications may not require the high performance achieved through the use of a leased line, and might desire a more inexpensive solution for implementing the link 13 between the source and target storage controllers in a remote mirroring data facility.

In view of the foregoing, it is an object of the present invention to provide an inexpensive link between two remotely disposed storage systems in a remote mirroring data facility.

SUMMARY OF THE INVENTION

One illustrative embodiment of the invention is directed to a computer system comprising a central processing unit (CPU); a first storage system that is coupled to the CPU so that the CPU can store information in the first storage system; a second storage system; at least one communication link coupling the second storage system to the CPU, the at least one communication link including a network cloud that is shared with at least one other resource so that no portion of the network cloud is dedicated exclusively to transferring information between the CPU and the second storage system; and a mirroring controller to mirror at least some of the information stored in the first storage system in the second storage system by transferring the at least some of the information through the network cloud.

Another illustrative embodiment of the invention is directed to a computer system comprising a central processing unit (CPU); a first storage system that is coupled to the CPU so that the CPU can store information in the first storage system; a second storage system; at least one communication link coupling the second storage system to the CPU, the at least one communication link including at least one wireless connection; and a mirroring controller to mirror at least some of the information stored in the first storage system in the second storage system by transferring the at least some of the information over the at least one communication link.

A further illustrative embodiment of the invention is directed to a computer system comprising a central processing unit (CPU); a first storage system; a first communication link coupling the first storage system to the CPU so that the CPU can store information in the first storage system; a second storage system; a second communication link coupling the second storage system to the CPU; a third storage system; a third communication link coupling the third storage system to the CPU; and a mirroring controller to mirror at least some of the information stored by the CPU in the first storage system in both the second and third storage systems.

Another illustrative embodiment of the invention is directed to a method of operating a computer system that includes a central processing unit (CPU), a first storage system, a first communication link coupling the first storage system to the CPU so that the CPU can store information in the first storage system, a second storage system, a second communication link coupling the second storage system to the CPU, a third storage system, and a third communication link coupling the third storage system to the CPU. The method comprises a step of (A) mirroring at least some of the information stored by the CPU in the first storage system in both the second and third storage systems by transferring the at least some of the information over the second and third communication links.

A further illustrative embodiment of the invention is directed to a method of mirroring information stored in a computer system comprising a central processing unit (CPU), a first storage system that is coupled to the CPU so that the CPU can store information in the first storage system, and a second storage system coupled to the CPU by at least one communication link, the at least one communication link including a network cloud that is shared with at least one other resource so that no portion of the network cloud is dedicated exclusively to coupling the second storage system to the CPU. The method comprises a step of (A) transmitting at least some of the information stored by the CPU in the first storage system into the network cloud with the second storage system designated as a destination for the at least some of the information, so that the at least some of the information can be transferred through the network cloud and mirrored in the second storage system.

A further illustrative embodiment of the invention is directed to a computer system capable of mirroring information in a remotely disposed target storage system that is coupled to the computer system via at least one communication link that includes a network cloud that is shared with at least one other resource. The computer system comprises a central processing unit (CPU) coupled to the network cloud; a source storage system that is coupled to the CPU so that the CPU can store information in the source storage system; and a controller to transfer at least some of the information stored in the source storage system into the network cloud so that the at least some of the information can be mirrored in the target storage system.

Another illustrative embodiment of the invention is directed to a computer system capable of mirroring information in a remotely disposed target storage system that is coupled to the computer system via at least one communication link that includes at least one wireless connection. The computer system comprises a central processing unit (CPU) coupled to the at least one communication link; a source storage system that is coupled to the CPU so that the CPU can store information in the source storage system; and a controller to transfer at least some of the information stored in the source storage system into the network cloud so that the at least some of the information can be mirrored in the target storage system.

Another illustrative embodiment of the invention is directed to a computer system comprising a central processing unit (CPU); a first storage system that is coupled to the CPU so that the CPU can store information in the first storage system; a second storage system; at least one communication link coupling the second storage system to the CPU so that the CPU can store information in the second storage system, the at least one communication link being selected from one of an Ethernet link, an asynchronous transfer mode (ATM) link, an FDDI link and a fibre channel link; and a mirroring controller to mirror at least some of the information stored in the first storage system in the second storage system by transferring the at least some of the information over the at least one communication link.

A further illustrative embodiment of the invention is directed to a computer system comprising a central processing unit (CPU); a first storage system that is coupled to the CPU so that the CPU can store information in the first storage system; a second storage system; at least one communication link coupling the second storage system to the CPU so that the CPU can store information in the second storage system, the at least one communication link being one of a packet switched network and a cell switched network; and a mirroring controller to mirror at least some of the information stored in the first storage system in the second storage system by transferring the at least some of the information over the at least one communication link.

Another illustrative embodiment of the invention is directed to a computer system comprising a central processing unit (CPU); a first storage system that is coupled to the CPU so that the CPU can store information in the first storage system; a second storage system; at least one communication link coupling the second storage system to the CPU so that the CPU can store information in the second storage system, the at least one communication link including a network cloud; and a mirroring controller to mirror at least some of the information stored in the first storage system in the second storage system by transferring the at least some of the information over the network cloud.

BRIEF DESCRIPTION OF THE DRAWINGS

FIG. 3 schematically represents a number of layers and protocols used in implementing the embodiment of the present invention directed to the use of a network cloud in a remote mirroring data facility;

DETAILED DESCRIPTION

One aspect of the present invention is directed to a method and apparatus for implementing a link between two remotely disposed storage systems in a remote mirroring data facility over a pre-existing and inexpensive data communication link. In one illustrative embodiment of the invention, a communication network that is accessible by other resources on a multiplexed basis is used to implement the link 13 between the source and target storage controllers 5 and 7 (FIG. 1), such that the remote mirroring data facility does not have exclusive use of any portion of the network. For example, the communication link 13 can be implemented over the Internet. Alternatively, the link 13 can be implemented over an intranet, or any network cloud. As used herein, the term network cloud defines a communication link that implements a protocol wherein information transferred through the cloud includes a destination address so that the information can be transported by the cloud to the appropriate destination. In another illustrative embodiment of the invention, the link 13 is implemented in a completely wireless fashion (e.g., using satellite or microwave point-to-point technology).

Figure 2:
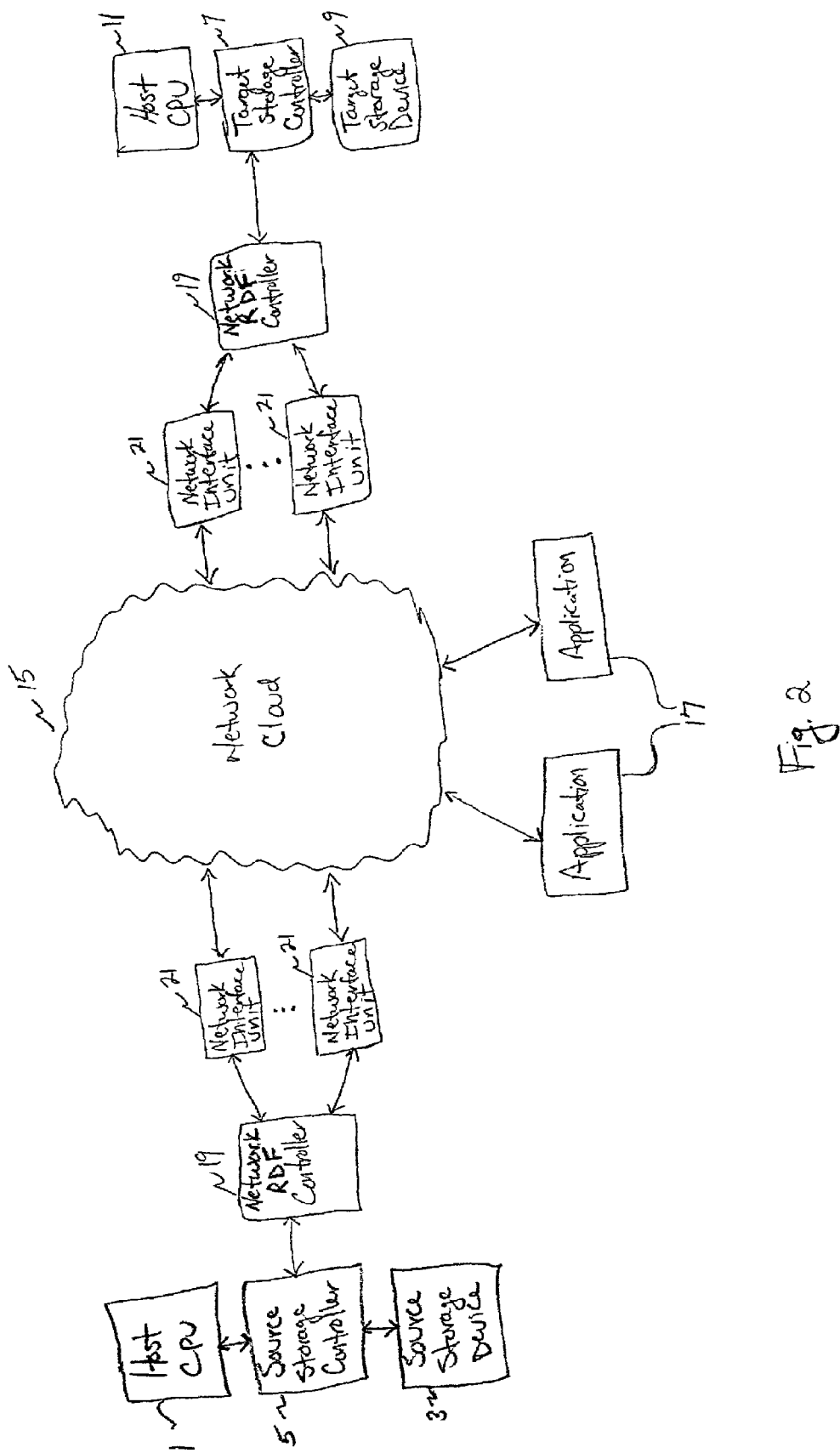
FIG. 2 illustrates a remote mirroring data facility implemented using a network cloud in accordance with one illustrative embodiment of the invention.

A first illustrative embodiment of the present invention is shown in FIG. 2, wherein the link 13 between the source and target storage controllers 5 and 7 is implemented via a network cloud 15. In contrast to a dedicated ESCON link or the use of a dedicated public communications resource (e.g., a T3 line), the network cloud 15 is a resource that typically is shared by the remote mirroring data facility with a number of additional applications 17.

Figure 1:
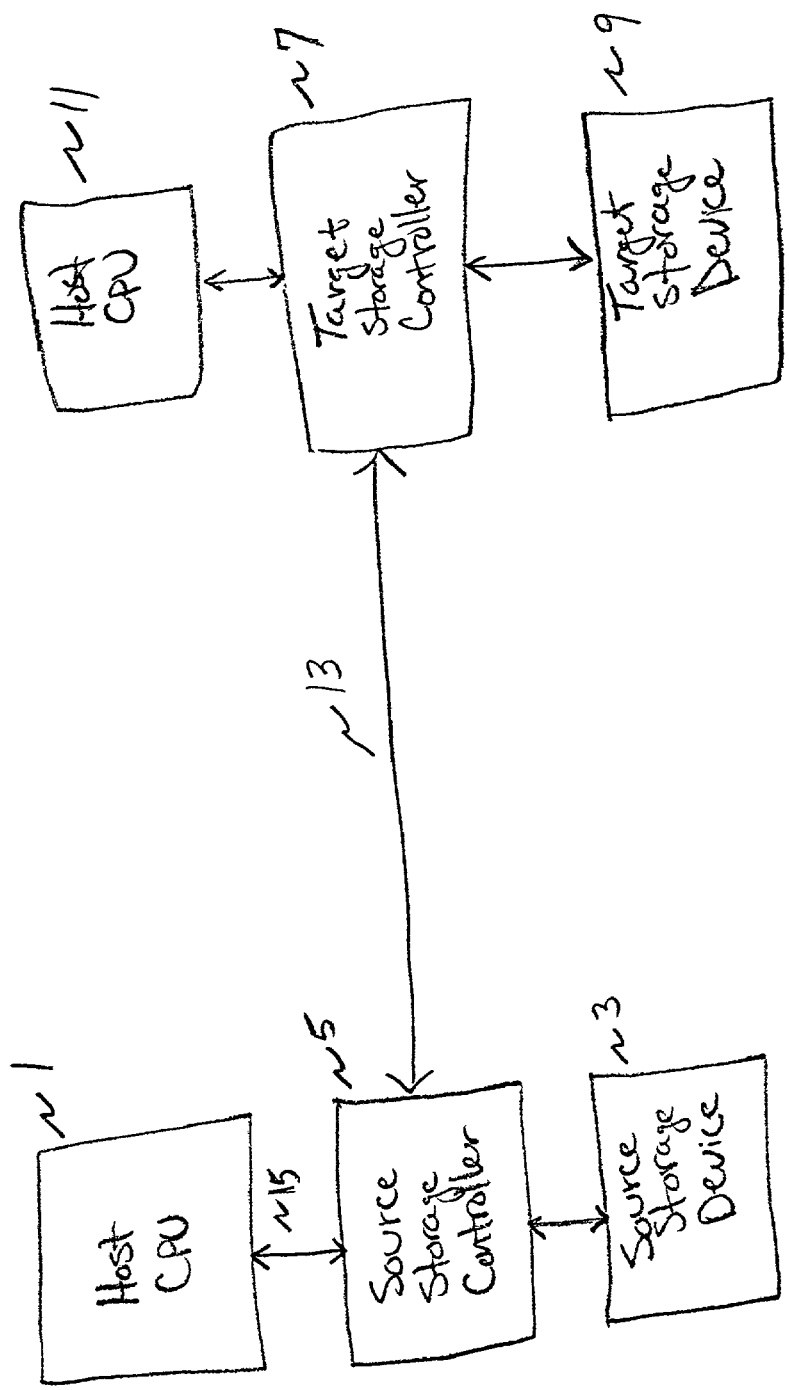
FIG. 1 illustrates a conventional remote mirroring data facility.

In one illustrative embodiment of the invention, the network cloud 15 is implemented via the Internet. Since most user sites wherein the source and target storage systems are located will have easy access to the Internet, no significant costs will be incurred in implementing the network cloud 15. In addition, the use of the network cloud 15 renders it unnecessary to lease a dedicated public communication line to interconnect the source and target storage systems, resulting in a less expensive implementation of the remote mirroring data facility. It should be appreciated that in view of the fact that the network cloud 15 may not be dedicated to the remote mirroring data facility and may be shared with other applications 17, the performance of the system may not be as great as if a dedicated line were used to implement the link 13 (FIG. 1). However, for some user configurations, the cost savings will more than compensate for any decrease in performance.

In another illustrative embodiment of the invention, the network cloud 15 is implemented via an intranet or private enterprise network. It should be appreciated that an intranet is similar in some respects to the Internet in that a number of different users and typically share the resource, but the network is exclusively reserved for a private enterprise. In addition, an intranet may have one or more gateways enabling access to the Internet. An intranet is typically implemented through a public communications network (e.g., using leased lines such as a T3 line), although an intranet can alternatively be implemented using dedicated private lines. The use of an intranet as the network cloud 15 that implements the link 13 (FIG. 1) between the source and target storage systems allows an enterprise to implement a remote mirroring storage facility in an inexpensive manner using an existing enterprise network, requiring little or no changes to the network configuration, and allowing the enterprise to locate remote mirroring data facility sites based on the geography of its private network. Thus, the intranet network cloud 15 can be used to move data between various geographic locations of the enterprise to perform various applications (e.g., payroll processing), while also being used to transfer information between two or more remote mirroring data facilities.

In another embodiment of the invention, the network cloud need not be shared with any resources, and can be dedicated solely to implementing the link 13 (FIG. 1) for the remote mirroring data facility. It should be appreciated that for some user installations, a pre-existing network cloud may exist that is no longer used for other applications. As with the use of the Internet or an intranet shared with other resources, the use of a pre-existing network cloud dedicated to the remote mirroring data facility provides a convenient and cost effective way of implementing the link 13 (FIG. 1).

As shown in FIG. 2, the remote mirroring data facility can include some additional hardware to interface both the source and target storage systems to the network cloud 15. In particular, on each side of the illustrative remote mirroring data facility shown in FIG. 2 is provided a network remote data facility (RDF) controller 19 and one or more network interface units 21. In one embodiment of the invention, this additional hardware is designed to be essentially transparent to the system disclosed the assignee's above-referenced co-pending applications. As discussed above, the latency of the information transferred through the network cloud may be greater than when using a dedicated link as discussed in the co-pending applications. Thus, timeouts for awaiting the handshaking signals in the protocols of the co-pending applications can be increased to reflect the expected greater latency. No other significant changes need be made to the system disclosed in the co-pending applications.

As discussed in the co-pending applications, the source and target storage controllers 5 and 7 perform the function of implementing the protocol for transferring information between them. In one illustrative embodiment of the present invention, any of the protocols discussed in the co-pending applications can be employed. However, it should be appreciated that the present invention is not limited in this respect, and that various other protocols can be employed for transferring information between the source and target storage controllers through the network cloud 15. As discussed in the assignee's co-pending applications, the protocol for transferring information between the source and target storage systems can be implemented via a processor in each of the source and target storage controllers that is programmed by software to generate and respond to the handshaking signals that implement the protocol. Alternatively, dedicated hardware can be employed to implement this protocol.

The purpose of the network RDF controller 19 is to place the information that implements the RDF protocol into a format that is capable of transmission through the network cloud, and to control the transport of the information through the cloud. These functions can be performed in any number of ways, as discussed in more detail below. In one embodiment of the present invention, the network RDF controller 19 is implemented as a standard IBM compatible personal computer (PC) that can be programmed to perform the desired functions. Implementing the network RDF controller 19 as a PC is advantageous because such commodity based hardware is relatively inexpensive. However, it should be understood that the invention is not limited in this respect, and that a number of other types of processors can alternatively be used. Furthermore, although a programmed processor provides a simple and straightforward implementation, it should be understood that the RDF controller can also be implemented using dedicated hardware.

The network interface unit 21 provides a direct or indirect connection to the network cloud 15, and can be implemented in any of a number of different ways. The hardware to implement the network interface unit can be obtained from a network service provider, or can be purchased from a networking equipment supplier. Thus, the network interface unit can, like the network RDF controller, be implemented using commodity based equipment in a cost effective fashion. Those of ordinary skill in the art will appreciate that a number of different direct physical connections to the network cloud 15 are possible, including, but not limited to, Ethernet, Fast Ethernet, Gigabit Ethernet, fibre channel, asynchronous transfer mode (ATM) and FDDI connections. In addition, a number of indirect connections are also possible through an Internet or network service provider. The particular hardware employed will depend upon the service provider. Typical options include standard PC modems, network adapters, ADSL, cable modems and asynchronous modems. Again, the present invention is not limited to any particular type of connection to the network cloud, as numerous options are currently possible, and as it is expected that additional options will continue to become available.

The network RDF controller 19 can include a host bus adapter (not shown) that enables communication with the network interface units 21. The particular nature of the host bus adapter will depend upon the type of network interface unit 21 used to interface the network RDF controller 19 to the network cloud 15. When the network RDF controller is implemented as a PC, the host bus adapter can be implemented as a card that plugs into an internal PC bus (e.g., a standard PCI bus) and is specifically adapted to communicate with the type of physical connection implemented by the network interface unit 21.

In one embodiment of the present invention, each of the network RDF controllers 19 can be coupled to the network cloud 15 through a single port or network interface unit 21. However, in an alternate embodiment of the invention shown in FIG. 2, multiple connections are provided to the network cloud to achieve increased performance. It should be appreciated that each path through the network cloud 15 between a pair of the network interface units 21 may be relatively slow. Therefore, by distributing the data to be transferred over the network cloud 15 amongst a plurality of network interface units 21, the network RDF controller 19 can achieve improved performance by sending packets of information in parallel through the network cloud 15, thereby creating a larger virtual pipe through the network cloud by combining a plurality of smaller physical pipes to the network cloud. Since each of the connections provided by the network interface units 21 to the network cloud 15 is relatively inexpensive, a relatively large number of connections (e.g., fifty) may still be cost effective for a user, while providing satisfactory performance in the transmission of packets of information over the network cloud 15.

Figure 4:
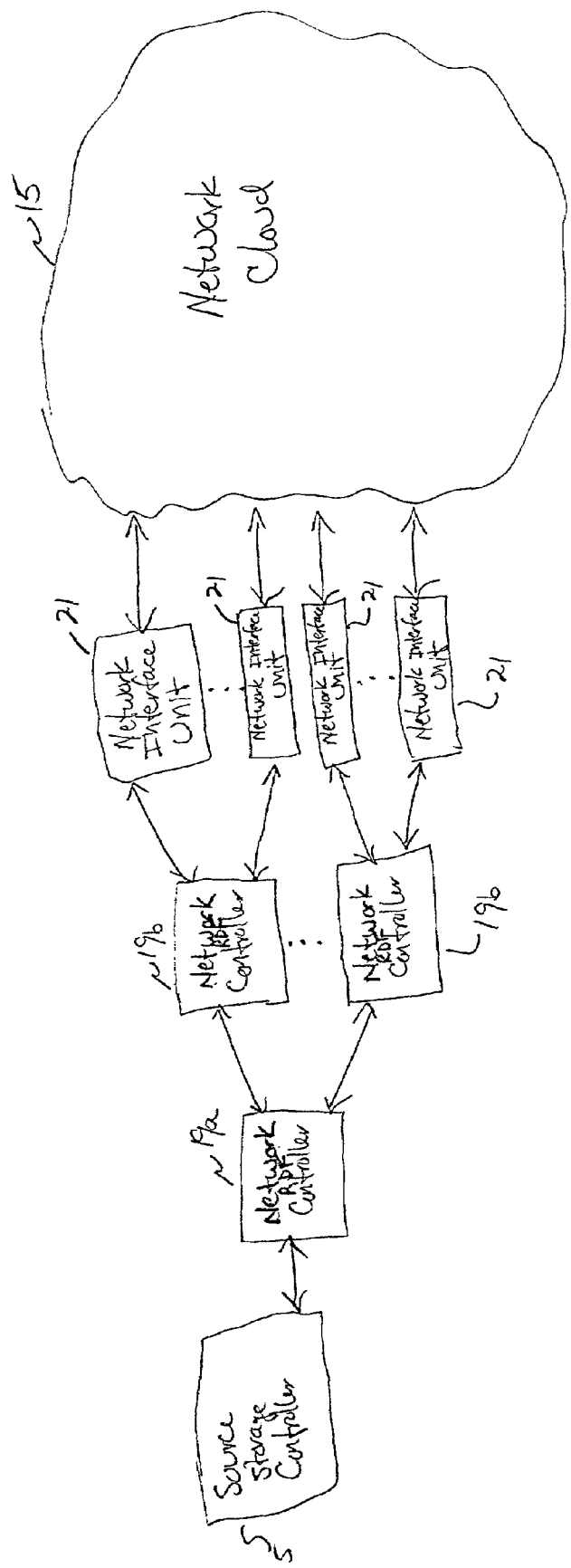
FIG. 4 illustrates the fragmentation of information via multiple controllers in accordance with one illustrative embodiment of the invention.

It should be appreciated that in addition to distributing the data sent from the network RDF controller 19 to the network interface units 21 as shown in FIG. 2, load sharing can also be performed at a number of other levels. For example, as shown in FIG. 4, multiple network RDF controllers can be provided, including a network RDF controller 19a coupled to the source storage controller 5 and a plurality of second level network RDF controllers 19b, each coupled to a corresponding network interface unit 21. In this implementation, data is initially distributed within the first level network RDF controller 19a, and then is further distributed in each of the second level network RDF controllers 19b. Although FIG. 4 illustrates a cascading of the network RDF controllers on only the source side of the network cloud 15, it should be appreciated that such cascading can also be performed on the target side.

In addition, data distribution can also be performed in the source storage controller 5, such that the source storage controller can be coupled to two or more network RDF controllers.

Performance is maximized in connection with the multiple paths into the network cloud by balancing the load passed between the various network interface units 21. Load balancing can be achieved using conventional techniques, such as dynamic buffer management. Similarly, the distribution of the data can be performed using conventional techniques, such as a one-to-many queue that incorporates heuristics for circuit metering. The re-combination of the data also can be accomplished using conventional techniques, such as a many-to-one queuing mechanism with order being preserved by the tag information included with each individual packet in accordance with the Internet Protocol discussed below.

A schematic representation of a number of software and hardware levels that can be employed to implement the illustrative embodiment of the invention shown in FIG. 2 is provided in FIG. 3. FIG. 3 illustrates a seven layer model in accordance with the Open Systems Interconnection (OSI) Reference Model developed by the International Standards Organization (ISO).

At the top level 30 is the application, which in this example is a protocol that implements the transfer of information between the source and target storage controllers 5, 7 to implement the remote data facility (RDF). As discussed above, this can be any of the protocols disclosed in the assignee's co-pending applications.

The next layer 31 is the presentation layer, which defines the format of the data transferred by the application. In one illustrative embodiment of the invention, no distinct presentation layer is provided, and the format of the data is defined in the application layer 30.

The next layer 32 is the session layer, which implements protocols for manipulating the application data prior to transportation through the network cloud. Various embodiments of the present invention support features that can be implemented in the session layer. For example, the control for the distribution of the data through multiple pipes (i.e., network interface units) into the network cloud can be implemented in the session layer. A number of proprietary systems have been developed for implementing the distribution of data through multiple pipes into a network cloud, such as the Internet or an intranet, for different types of applications, but no standard has been adopted. The present invention is not limited to any particular implementation.

Various other techniques for manipulating the application data can also be implemented in the session layer, including encryption and compression techniques discussed below.

Next is the transport layer 33 for moving packets of information over the network cloud. It should be appreciated that when packets of information are sent from a source to a destination through a network cloud 15, the packets may not arrive in the same order at the destination, and some packets may become lost. The transport protocol splits the data into multiple packets at the source (e.g., the source storage controller 5), tags those packets to indicate the destination, then acknowledges receipt of each of the packets at the destination and reconstructs the packets in the proper order. In addition, if any packets are lost, the transport protocol can recover the lost packets and/or request that the source re-send the packets. Thus, the transport protocol provides an end-to-end reliable link between the RDF controllers 19 via the network cloud. Examples of conventional transport protocols that can be employed with the RDF application of the present invention include the User Datagram Protocol (UDP) which is a connectionless protocol, and the Transmission Control Protocol (TCP) which is a connection-oriented protocol. However, it should be appreciated that the present invention is not limited to the use of any particular transport protocol as others are possible. The transport protocol can be implemented in the network RDF controller 19, e.g., by software running on the PC when the RDF controller is implemented by a PC.

Next is the network layer 34 that builds packets of information to be passed over the cloud 15. An illustrative example for the network layer is the Internet Protocol (IP), which is the protocol that is used in passing information over the Internet. In accordance with the Internet Protocol, information is passed across the Internet in packets, each with an address identifying the destination of the packet. The generation of the packets and implementation of the Internet Protocol can be performed, like the transport layer, in the network RDF controller 19.

Next is the data link layer 35 that defines the physical format of the data to be transferred to and/or from the network cloud. As discussed above, any number of alternatives can be employed (e.g., Ethernet, T3, FDDI and ATM), with the present invention not being limited to any particular type of physical connection.

Finally, the lowest level of communication is the physical layer 36 that is the actual physical link used to interface the network RDF controller 19 to the network cloud. As discussed above, any number of alternatives can be employed (e.g., coaxial cables, fiber optic cables, copper cables, etc.), with the present invention not being limited to any particular type of physical connection.

As discussed above, conventional remote mirroring data facilities have employed either a dedicated ESCON link or a dedicated leased line to implement the link 13 (FIG. 1). Thus, conventional remote mirroring data facilities have employed a circuit switched connection, wherein all information transferred between the source and target storage controllers passes over the same path through the connection. In contrast, it should be appreciated that one aspect of the present invention is directed to the implementation of the link 13 (FIG. 1) in a remote mirroring data facility using a packet switched or cell switched network, wherein information can be passed between the source and target storage systems through different paths through the network. As will be appreciated by those of ordinary skill in the art, packet switched networks can pass information between two points on the network through a plurality of different paths, with the information being split into multiple packets at the source, and then being reconstructed in the proper order at the destination. Cell switched networks (e.g., ATM networks) work in a similar fashion, except that information is split and distributed on cell boundaries, rather than packet boundaries. Typically, packet switched networks employ variably sized packets, whereas cell switched networks utilize cells of information having a fixed size.

It should be appreciated that by implementing the link 13 (FIG. 1) between the source and target storage systems in the remote mirroring data facility via a network cloud, a number of features commonly supported in such networks can be employed. One of these features is a multi-cast feature wherein data transferred from a source can be transmitted to more than one destination. Another related feature is a broadcast wherein data transferred from one site is transmitted to all sites. Using either of these features, a remote mirroring data facility can be employed having two target mirroring storage controllers 7 and storage devices 9 disposed at different physical locations to provide added protection for the data in the source storage system. In contrast to conventional systems wherein a dedicated or leased line must be provided between the source and each target, making the implementation of multiple mirrors very costly, the use of a pre-existing network cloud 15 to implement the link 13 (FIG. 1) enables multiple mirrors to be provided without significant additional costs.

It should be appreciated that some network clouds employ wireless links, including satellite links or land-based links such as a point-to-point microwave communication system. Another aspect of the present invention is the recognition that such wireless communication techniques can be used to implement the link 13 in the remote mirroring data facility of FIG. 1. This aspect of the present invention is independent of the use of a network cloud, such that a dedicated wireless transmission link can be employed to implement link 13 (FIG. 1). The wireless transmission link can be implemented using any type of wireless technology (e.g., satellites and point-to-point microwave transmission), and can be implemented as a private system or can be leased from a service provider.

Figure 5:
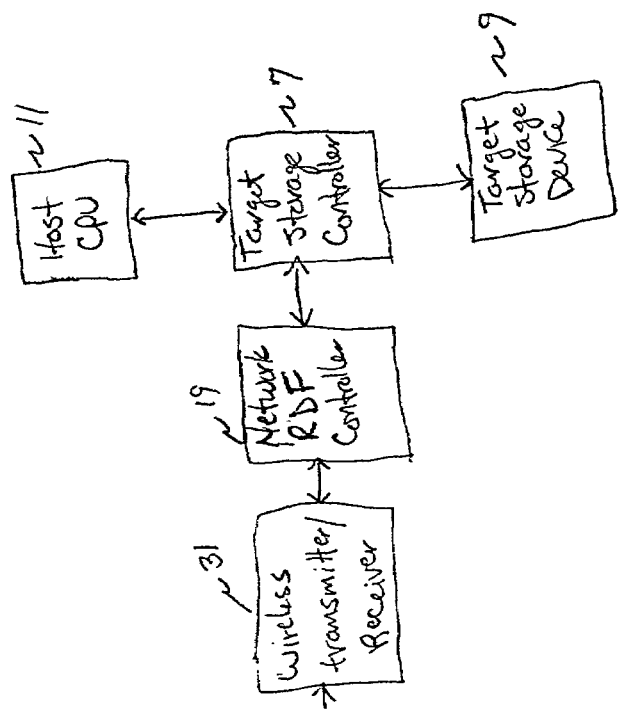
FIG. 5 illustrates a remote mirroring data facility including a wireless communication link between the source and target storage system in accordance with another illustrative embodiment of the invention.
Figure 5:
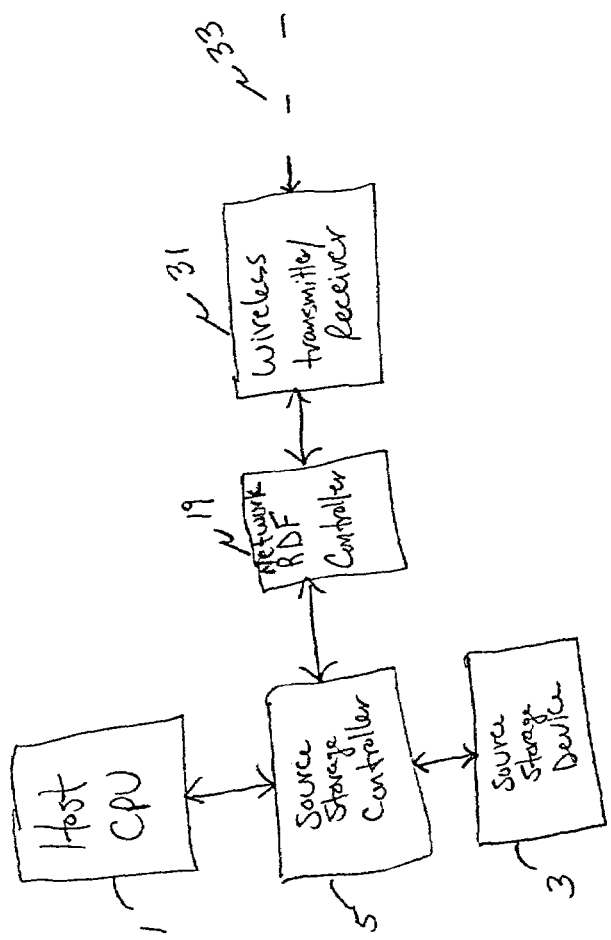

An illustrative implementation of the embodiment of the present invention that employs a wireless communication system to implement the link 13 (FIG. 1) between the source and target storage devices is shown in FIG. 5. As seen in FIG. 5, the network RDF controller 19 on both the source and target sides is coupled to a wireless transmitter/receiver 31. The wireless transmitter/receivers communicate via a wireless communication channel 33, indicated in FIG. 5 by a dotted line. As discussed above, the wireless transmitter/receivers can be implemented using satellite technology, microwave point-to-point technology, or any other type of wireless communication technology.

In one embodiment of the present invention wherein the RDF controller 19 is implemented by a PC, the PC can also execute a number of other functions for the host CPU 1 and its associated source storage system. In addition, at least one additional PC may also be provided that is on standby, and does not have any responsibilities during normal operation. In the event that a malfunction occurs with the main PC that implements the RDF controller 19, the standby PC can be used in its place, thereby increasing the reliability of the system.

In one embodiment of the present invention, encryption techniques are employed to provide security for the data transferred between the source and target storage units over the network cloud 15. The encryption can be performed in any number of ways, and the present invention is not limited to any particular encryption technique. For example, encryption can be performed in software in the RDF controller 19, or dedicated hardware can be used.

In another embodiment of the present invention, compression techniques can be employed on the data transferred between the source and target storage systems over the network cloud 15. By compressing the data prior to transmission over the network cloud 15, fewer packets of information will be sent over the network cloud, thereby increasing the performance of the system. Compression can be performed using any number of techniques, and the present invention is not limited to any particular compression technique. For example, compression can be performed in software in the RDF controller 19, or dedicated hardware can be provided to implement the compression techniques.

As discussed above, the purpose for most remote mirroring data facilities is to allow for the recovery of data if a problem is experienced with the source storage system. To this end, when the host CPU 1 performs a write to the source storage system, the operation will generally not terminate until the host CPU is assured that the data has been successfully stored in the source storage system. In addition, conventional remote mirroring data facilities may also not release the host CPU 1 until an indication is provided that the data has also been successfully stored on the target storage system. However, some conventional remote mirroring data facilities have the capability of implementing a store and forward option, wherein the data written to the source storage system is also stored in a temporary storage area on the source side of the link 13 (FIG. 1), and is then subsequently transferred from the temporary storage location to the target storage system. In accordance with the store and forward option, the host CPU 1 is released when the data is stored on the source storage system and in the temporary storage area.

In one illustrated embodiment of the invention, the remote mirroring data facility supports the store and forward option so that, if desired by the user, the operation of the host CPU 1 is not impacted by the latency through the network cloud 15 (FIG. 2). Of course, it should be appreciated that the greatest protection for the data results when it is ultimately stored on the target storage system. Therefore, for each user application, the decision can be made as to whether to maximize the protection of the system, at the expense of not releasing the host CPU 1 until the data is stored on the target storage system, or to maximize performance at the expense of some degree of data protection by releasing the host CPU 1 when the data is stored in the temporary storage area on the source side of the network cloud 15.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer system comprising:
   a central processing unit (CPU);
   a first storage system that is coupled to the CPU to store information written from the CPU;
   a second storage system;
   at least one communication link coupling the second storage system to the CPU, the at least one communication link including a network cloud that is shared with at least one other resource so that no portion of the network cloud is dedicated exclusively to transferring information between the CPU and the second storage system, wherein the at least one communication link extends between the first and second storage systems such that the second storage system is coupled to the CPU via the first storage system; and
   a mirroring controller, responsive to the information being written from the CPU to the first storage system, to mirror at least some of the information written from the CPU to the first storage system in the second storage system by transferring the at least some of the information through the network cloud.

2. The computer system of claim 1, wherein the network cloud includes the Internet, so that the network cloud is publicly accessible.

3. The computer system of claim 1, wherein the network cloud comprises an intranet.

4. The computer system of claim 1, wherein the at least one communication link is one of a packet switched network and a cell switched network.

5. The computer system of claim 1, wherein the CPU includes means for communicating with the at least one other resource via the network cloud.

6. The computer system of claim 1, wherein the at least one communication link includes a plurality of communication paths from the CPU to the network cloud, so that a plurality of packets of information can be transferred from the CPU to the second storage system in parallel through the network cloud.

7. The computer system of claim 6, wherein the at least one communication link includes a plurality of communication paths from the network cloud to the second storage system, so that a plurality of packets of information can be transferred in parallel from the network cloud to the second storage system.

8. The computer system of claim 1, wherein the at least one communication link includes a plurality of communication paths from the network cloud to the second storage system, so that a plurality of packets of information can be transferred in parallel from the network cloud to the second storage system.

9. The computer system of claim 1, wherein the at least one communication link includes at least one wireless connection.

10. The computer system of claim 1, wherein the mirroring controller is distributed between the first and second storage systems.

11. The computer system of claim 10, wherein the mirroring controller includes means, distributed between the first and second storage systems, for mirroring the at least some of the information written from the CPU to the first storage system in the second storage system.

12. The computer system of claim 11, wherein the CPU is a first CPU, and wherein the system further includes a second CPU coupled to the second storage system.

13. The computer system of claim 1, wherein the at least one communication link extends between the first and second storage systems such that the second storage system is coupled to the CPU via the first storage system, and wherein the computer system further includes:
 a third storage system coupled to the first storage system via the at least one communication link so that the CPU can store information in the third storage system via the first storage system; and
 wherein the mirroring controller includes means, distributed between the first, second and third storage systems, for mirroring the at least some of the information written from the CPU to the first storage system in both of the second and third storage systems.

14. The computer system of claim 11, wherein the at least one communication link includes at least one wireless connection.

15. The computer system of claim 11, wherein the at least one communication link includes a plurality of communication paths from the CPU to the network cloud, so that a plurality of packets of information can be transferred from the CPU to the second storage system in parallel through the network cloud.

16. The computer system of claim 15, wherein the at least one communication link includes a plurality of communication paths from the network cloud to the second storage system, so that a plurality of packets of information can be transferred in parallel from the network cloud to the second storage system.

17. The computer system of claim 11, wherein the at least one communication link is one of a packet switched network and a cell switched network.

18. The computer system of claim 11, wherein the network cloud comprises an intranet.

19. The computer system of claim 11, wherein the network cloud includes the Internet, so that the network cloud is publicly accessible.

20. The computer system of claim 2, wherein the at least one communication link includes a plurality of communication paths from the network cloud to the second storage system, so that a plurality of packets of information can be transferred in parallel from the network cloud to the second storage system.

21. The computer system of claim 3, wherein the at least one communication link includes a plurality of communication paths from the network cloud to the second storage system, so that a plurality of packets of information can be transferred in parallel from the network cloud to the second storage system.

22. A computer system comprising:
 a central processing unit (CPU);
 a first storage system that is coupled to the CPU to store information written from the CPU;
 a second storage system;
 at least one communication link coupling the second storage system to the CPU, the at least one communication link including at least one wireless connection, wherein the at least one communication link extends between the first and second storage systems such that the second storage system is coupled to the CPU via the first storage system;
 a mirroring controller, responsive to the information being written from the CPU to the first storage system to mirror at least some of the information being written from the CPU to the first storage system in the second storage system by transferring the at least some of the information over the at least one communication link;
 wherein the at least one communication link includes a network cloud that comprises an internet shared by at least one other resource.

23. A computer system comprising:
 a central processing unit (CPU);
 a first communication link;
 a first storage system coupled to the CPU via the first communication link to store information written from the CPU;
 a second storage system;
 a second communication link coupling the second storage system to the CPU, wherein the second communication link extends between the first and second storage systems so that the second storage system is coupled to the CPU via the first storage system;
 a third storage system;
 a third communication link coupling the third storage system to the CPU, wherein the third communication link extends between the first and third storage systems so that the third storage system is coupled to the CPU via the first storage system; and
 a mirroring controller, responsive to the information being written from the CPU to the first storage system, to mirror at least some of the information written from the CPU to the first storage system in both the second and third storage systems;
 wherein the second and third communication links each comprises a network cloud that is shared by the first, second and third storage systems.

24. The computer system of claim 23, wherein the mirroring controller is distributed between the first, second and third storage systems.

25. The computer system of claim 23, wherein at least one of the second and third communication links is one of a packet switched network and a cell switched network.

26. The computer system of claim 23, further including means for multicasting the at least some of the information stored by the CPU in the first storage device to the second and third storage systems.

27. The computer system of claim 23, wherein the mirroring controller is distributed between the first and second storage systems.

28. A method of operating a computer system that includes a central processing unit (CPU), a first communication link, a first storage system coupled to the CPU via the first communication link to store information written from the CPU, a second storage system, a second communication link coupling the second storage system to the CPU and extending between the first and second storage systems so that the second storage system is coupled to the CPU via the first storage system, a third storage system, and a third communication link coupling the third storage system to the CPU and extending between the first and third storage systems so that the third storage system is coupled to the CPU via the first storage system, wherein each of the second and third communication links is formed through a network cloud that is shared by the first, second and third storage systems, the method comprising a step of:
 (A) in response to the information being written from the CPU to the first storage system, mirroring at least some of the information written from the CPU to the first storage system in both the second and third storage systems by transferring the at least some of the information over the second and third communication links through the network cloud.

29. The method of claim 28, wherein step (A) includes a step of:
multicasting the at least some of the information stored by the CPU in the first storage device to the second and third storage systems over the network cloud.

30. A method of mirroring information stored in a computer system comprising a central processing unit (CPU), a first storage system that is coupled to the CPU to store information written from the CPU, and a second storage system coupled to the CPU by at least one communication link, the at least one communication link including a network cloud that is shared with at least one other resource so that no portion of the network cloud is dedicated exclusively to coupling the second storage system to the CPU, wherein the at least one communication link extends between the first and second storage systems such that the second storage system is coupled to the CPU via the first storage system, the method comprising a step of:
A)—in response to the information being written from the CPU to the first storage system, transmitting, from the first storage system, into the network cloud at least some of the information written from the CPU to the first storage system with the second storage system designated as a destination for the at least some of the information, so that the at least some of the information can be transferred through the network cloud and mirrored in the second storage system.

31. The method of claim 30, wherein the network cloud includes the Internet, and wherein step (A) includes a step of transmitting the at least some of the information into the Internet.

32. The method of claim 30, wherein the network cloud includes an intranet, and wherein step (A) includes a step of transmitting the at least some of the information into the intranet.

33. The method of claim 30, wherein the CPU is coupled to the network cloud through a plurality of communication paths; and
wherein step (A) includes a step of transmitting a plurality of packets of the at least some of the information in parallel from the CPU to the network cloud.

34. The method of claim 33, wherein the second storage system is coupled to the network cloud through a plurality of communication paths; and
wherein step (A) includes a step of transferring a plurality of packets of the at least some of the information in parallel from the network cloud to the second storage system.

35. The method of claim 30, wherein the second storage system is coupled to the network cloud through a plurality of communication paths; and
wherein step (A) includes a step of transferring a plurality of packets of the at least some of the information in parallel from the network cloud to the second storage system.

36. The method of claim 30, wherein the computer system further includes a third storage system coupled to the CPU through the network cloud, and wherein the method further comprises a step of transmitting at least some of the information stored by the CPU in the first storage system into the network cloud with the third storage system designated as a destination for the at least some of the information, so that the at least some of the information can be transferred through the network cloud and mirrored in both the second and third storage systems.

37. The method of claim 30, further comprising a step of:
(B) storing the at least some of the information transferred through the network cloud in the second storage system.

38. A computer system capable of mirroring information in a remotely disposed target storage system that is coupled to the computer system via at least one communication link that includes a network cloud that is shared with at least one other resource, the computer system comprising:
a central processing unit (CPU) coupled to the network cloud;
a source storage system that is coupled to the CPU to store information written from the CPU, the source storage system to be coupled to the at least one communication link so that the at least one communication link extends between the source and target storage systems such that the CPU is coupled to the network cloud via the source storage system; and
a controller, responsive to the information being written from the CPU to the source storage system, to transfer at least some of the information written from the CPU into the network cloud so that the at least some of the information can be mirrored in the target storage system.

39. The computer system of claim 38, wherein the network cloud includes the Internet, so that the network cloud is publicly accessible.

40. The computer system of claim 38, wherein the network cloud comprises an intranet.

41. The computer system of claim 38, wherein the CPU is coupled to the network cloud through a plurality of communication paths so that a plurality of packets of information can be transferred from the CPU to the target storage system in parallel through the network cloud.

42. The computer system of claim 38, wherein the source storage system comprises the controller.

43. The computer system of claim 42, wherein the controller includes means, distributed between the source and target storage systems, for mirroring the at least some of the information stored in the source storage system in the target storage system.

44. A computer system comprising:
a central processing unit (CPU);
a first storage system that is coupled to the CPU to store information written from the CPU;
a second storage system;
at least one communication link coupling the second storage system to the CPU so that the CPU can store information in the second storage system, the at least one communication link being selected from the group consisting of an intranet and the Internet, wherein the at least one communication link extends between the first and second storage systems such that the second storage system is coupled to the CPU via the first storage system; and
a mirroring controller, responsive to the information being written from the CPU to the first storage system, to mirror at least some of the information written from the CPU to the first storage system in the second storage system by transferring the at least some of the information over the at least one communication link.

45. The computer system of claim 44, wherein the mirroring controller is distributed between the first and second storage systems.

46. The computer system of claim 45, wherein the mirroring controller includes means, distributed between the first and second storage systems, for mirroring the at least some of the information stored in the first storage system in the second storage system.

47. A computer system comprising:
a central processing unit (CPU);
a first storage system that is coupled to the CPU to store information written from the CPU;
a second storage system;
at least one communication link coupling the second storage system to the CPU, the at least one communication link including a network cloud that is shared with at least one other resource so that no portion of the network cloud is dedicated exclusively to transferring information between the CPU and the second storage system, wherein the at least one communication link extends between the first and second storage systems such that the second storage system is coupled to the CPU via the first storage system, and wherein the at least one communication link includes a plurality of communication paths from the CPU to the network cloud, so that a plurality of packets of the information can be transferred from the CPU to the second storage system in parallel through the network cloud; and
a mirroring controller, responsive to the information being written from the CPU to the first storage system, to mirror at least some of the information written from the CPU to the first storage system in the second storage system by transferring the at least some of the information through the network cloud.

48. The computer system of claim 47, wherein the at least one communication link includes a plurality of communication paths from the network cloud to the second storage system, so that a plurality of packets of information can be transferred in parallel from the network cloud to the second storage system.

49. The computer system of claim 47, wherein the mirroring controller is distributed between the first and second storage systems.

50. A method of mirroring information stored in a computer system comprising a central processing unit (CPU), a first storage system that is coupled to the CPU to store information written from the CPU, and a second storage system coupled to the CPU by at least one communication link, the at least one communication link including a network cloud that is shared with at least one other resource so that no portion of the network cloud is dedicated exclusively to coupling the second storage system to the CPU, and wherein the at least one communication link extends between the first and second storage systems such that the second storage system is coupled to the CPU via the first storage system, the method comprising a step of:

A) in response to the information being written from the CPU to the first storage system, transmitting at least some of the information written from the CPU to the first storage system over at least two parallel paths into the network cloud with the second storage system designated as a destination for the at least some of the information, so that the at least some of the information can be transferred through the network cloud and mirrored in the second storage system.

51. A computer system capable of mirroring information in a remotely disposed target storage system that is coupled to the computer system via at least one communication link that includes a network cloud that is shared with at least one other resource, the computer system comprising:
a central processing unit (CPU) coupled to the network cloud; and
a source storage system that is coupled to the CPU to store information written from the CPU;
wherein the source storage system includes a controller, responsive to the information being written from the CPU to the source storage system, to transfer at least some of the information written from the CPU from the source storage system into the network cloud so that the at least some of the information can be mirrored in the target storage system, wherein the source storage system is coupled to the network cloud through a plurality of communication paths so that a plurality of packets of the information can be transferred from the source storage system to the target storage system in parallel through the network cloud.

\* \* \* \* \*